Oct. 9, 1934.  C. ANDERSON  1,976,594
INTERLOCKING CONTROL FOR CARDIOGRAPHS
Filed Feb. 23, 1933    2 Sheets-Sheet 1

WITNESSES:  
INVENTOR  
Clare Anderson.  
BY  
ATTORNEY

Oct. 9, 1934.  C. ANDERSON  1,976,594
INTERLOCKING CONTROL FOR CARDIOGRAPHS
Filed Feb. 23, 1933  2 Sheets-Sheet 2
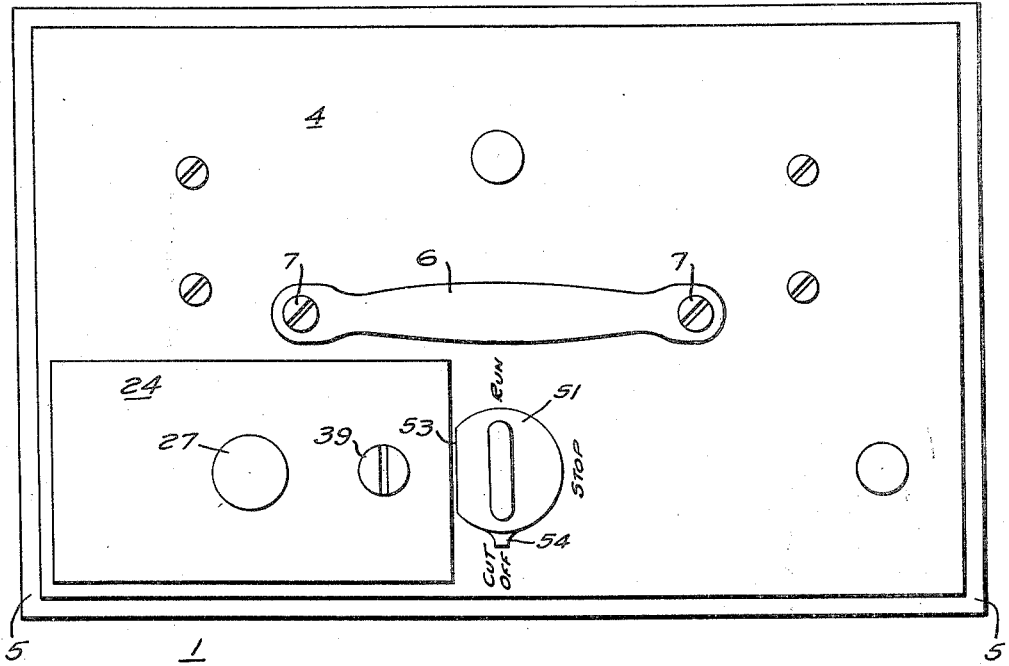
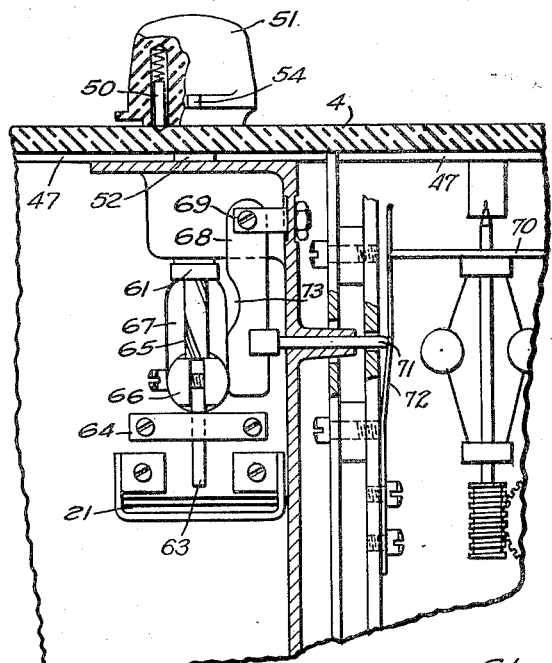
WITNESSES:
INVENTOR
Clare Anderson.
BY
ATTORNEY Patented Oct. 9, 1934

1,976,594

UNITED STATES PATENT OFFICE 1,976,594

INTERLOCKING CONTROL FOR CARDIOGRAPHS

Clare Anderson, Belleville, N. J., assignor to Westinghouse Electric & Manufacturing Company, East Pittsburgh, Pa., a corporation of Pennsylvania Application February 23, 1933, Serial No. 658,038

7 Claims. (Cl. 95—31)

My invention pertains to a control mechanism and more particularly it relates to an interlocking mechanism whereby a single actuable element may be manipulated to control the Run, Stop and Film cut-off functions of an electrocardiograph, or similar apparatus in the proper sequence.

Electro-cardiographs, and devices of this nature, have previously been provided with separate control elements for controlling the functions of run, stop and film cut-off with the result that unskilled operators often manipulated the controls in the wrong sequence and rendered the apparatus inoperative or ruined the photographic records.

It is accordingly an object of my invention to combine the various controls of such devices with a single manipulatable element by which they may all be controlled simultaneously and in the proper sequence.

Another object of my invention is to provide interlocking mechanism which will prevent the operation of any control element of such a device to a position which will be incorrect relative to the position of the other control elements or members of the device.

A further object of my invention is to provide an interlocking control mechanism for cardiographs to render them commercially practical in the hands of doctors, nurses, and other persons unfamiliar with electro-mechanical apparatus.

The invention itself, however, both as to its organization and its method of operation, together with additional objects and advantages thereof, will best be understood from the following description of a specific embodiment, when read in conjunction with the accompanying drawings, in which:

Fig. 2 is a plan view of the camera unit; and

Fig. 3 is a sectional view taken on line III—III of Fig. 1.

Figure 1:
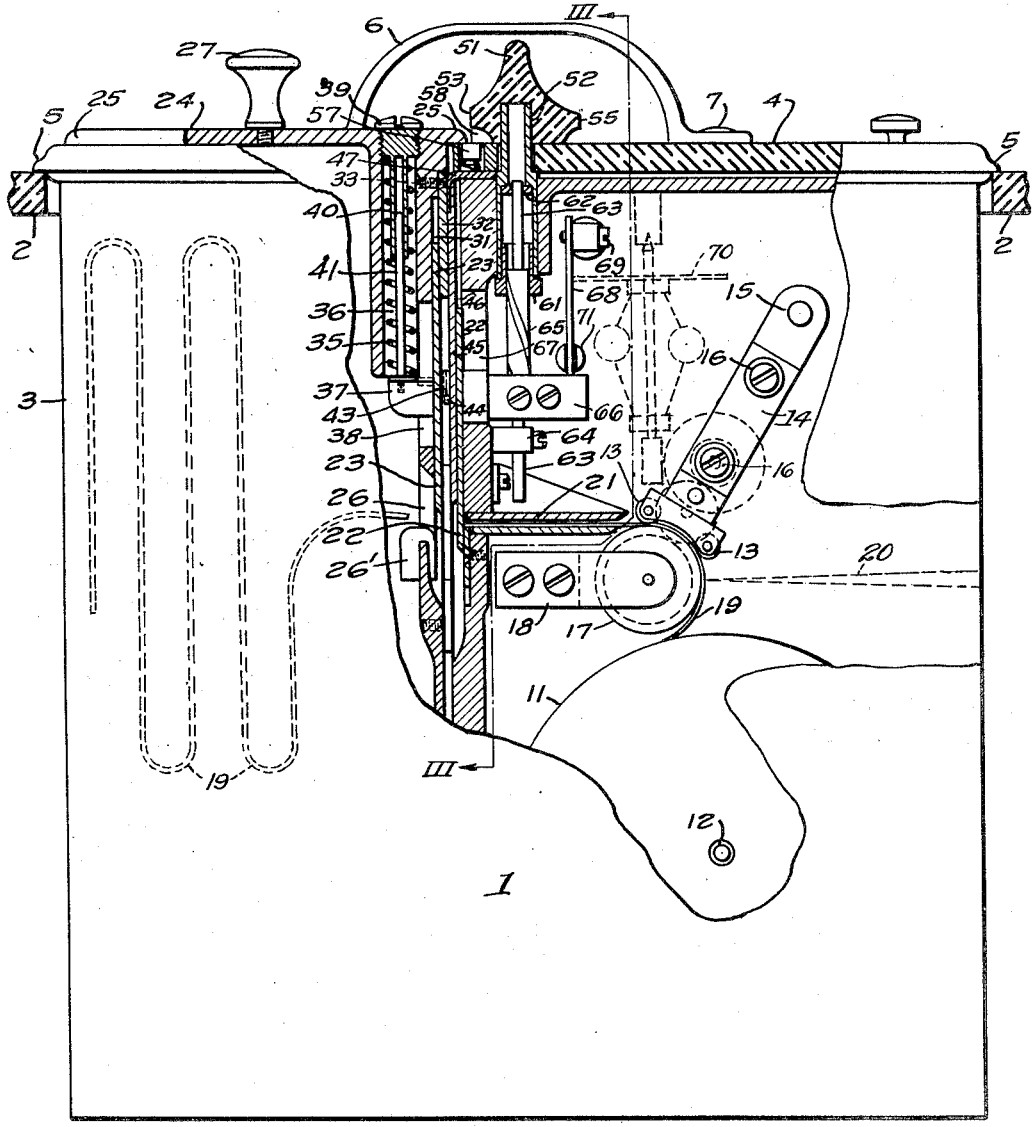
Figure 1 is a side elevational view, partly in section, showing an electro-cardiograph camera unit provided with an interlocking control mechanism in accordance with my invention.

Referring more specifically to the drawings, the apparatus comprises a camera unit 1 supported in a panel 2 which, as shown, is part of an electro-cadiograph, although my invention may be incorporated in any similar apparatus. The casing 3 of the camera unit 1 is closed by a top plate 4 which has wide protruding flanges 5 for supporting the unit 1 on the adjacent edges of the instrument panel 2. A handle 6 is secured to the top plate 4 by suitable screws or bolts 7.

By grasping the handle 6 an attendant may readily lift the camera unit 1 from the panel 2 of the associated device.

The camera unit 1 is provided with a film reel 11 which is removably journalled within the camera casing 3 on a fixed shaft 12. A pair of movable guide rollers 13 are journalled in the end of an arm 14 which is pivotally supported in the casing on a suitable pivot pin 15. The arm 14 preferably consists of two portions joined together by bolts 16 which may be loosened to adjust its length. A large guide pulley 17 is journalled on a stationary bracket 18 adjacent the small guide rollers 13, and is driven by any suitable constant speed motor well known in the art, such for example as a governor regulated spring motor commonly used in phonographs.

In operation narrow motion picture film 19 passes from the reel 11 around the large pulley 17 and under the small rollers 16, thence through the film guide channel 21, under a slidable cutter blade 22 and through a slidable shutter 23 into a magazine 24, and the film is exposed to a moving beam of light 20 projected on the large pulley 17, in any well known manner, from a mirror galvanometer or oscillograph which is not a part of my invention.

In order that the exposed portion of film may be removed and developed when desired, the magazine 24 comprises a removable box having a wide peripheral end flange 25 and it rests in an opening in the top plate 4 of the camera unit where it is supported by the flange 25. The magazine 24 is a chamber comprising a casting, one wall of which has an open portion 26 through which the motion picture film 19 passes to a suitable receiver or spring driven reel in the magazine. The lower edge of the opening 26 is slightly displaced toward the interior of the magazine and is provided with a plush covering 26' which may be cemented thereto. A knob 27 on the upper wall of the magazine facilitates removal.

In order that the opening 26 may be closed to prevent fogging of the film 19 when the magazine 24 is removed, the shutter member 23 is slidably supported in a recess 31 provided in the wall of the magazine. A retaining plate 32 is secured to the side wall by a screw 33 for holding the shutter 23 in its recess.

A compression spring 35 is carried in a spring chamber 36 in the magazine and continually reacts downwardly on the end of an arm 37 projecting laterally from the shutter 23 through a slot 38 in the magazine side wall. The upper end of the spring chamber 36 is closed by a cap 39 having a tubular spring guide 40 depending therefrom which telescopically receives a guide pin 41 extending upwardly from the end of the shutter arm 37. These telescoping guide members prevent the biasing spring 35 buckling and binding on the side walls of the spring chamber 36.

The shutter 23 is provided with a lug 43 which projects outwardly from the magazine and rests upon a stop 44 projecting from the adjacent side plate 45 secured to the wall of the camera unit. When the magazine 24 is removed from the camera unit 1 the lug 43 is disengaged from the stop 44 and the biasing spring 35 pushes the shutter 23 down until the lateral arm 37 strikes the bottom of the slot 38. The shutter then completely closes the film passage 26 in the side wall of the magazine thereby preventing the entrance of light destroying the record on the exposed film before it has been developed and "fixed" to render it permanent.

When the film has been removed from the magazine 24 and the latter is reinserted in the camera unit, the stop 44 on the side wall thereof engages the projection 43 on the shutter 23 and limits its downward movement. When the magazine has been completely lowered to its final position the shutter is held open, as shown in Fig. 1, to permit the introduction of the photographic film which passes freely therein.

The cut-off knife 22 is controlled by a rotatable control knob 51 on the top plate 4 of the camera unit which knob also simultaneously controls various other operations of the apparatus associated therewith. The knife 22 is slidably supported in a groove 46 between the side plate 45 and the wall of the camera unit to which it is secured in any suitable manner. The upper end of the knife groove 46 is closed by an angular knife cover 47 secured between the top plate 4 and the side wall in any suitable manner. The upper portion of the side wall is slightly depressed adjacent the knife and the side plate 45. The side wall may be a casting with an integral top wall which is secured parallel to the top plate 4.

The rotatable control knob 51 is mounted on the end of a tubular shaft 52 to which it is rigidly secured. The knob 51 is of substantially circular projection except that it is flattened on one side at 53 and has an indicating pointer 54 on another side, as shown in Fig. 2. The periphery of the knob, with the exception of the flattened portion 53, comprises a laterally projecting collar 55, as shown in Fig. 1, which normally overlaps the edge of the magazine 24 and prevents its removal without first turning the flat portion of the knob adjacent thereto.

A recess in the top plate 4 of the camera unit contains a spring pressed latch member 57 which is normally held depressed in the plate 4 by the wide flange 25 of the magazine which overlaps one end of the latch 57 as long as the magazine 24 is in its operative position. When the magazine is removed, however, the latch 56 is projected from the top plate by a spring and enters a slot 58 on the underside of the knob 51 thereby locking the knob and preventing the knob being manipulated and running film while the magazine is out. To do so would jam the film and prevent the film from entering the next time the magazine is inserted and the motor started.

Assuming the magazine is inserted in its operative position in the camera unit the spring biased latch 57 is depressed and the knob 51 is free to rotate. To hold the control knob 51 in its various operated positions a spring pressed stop pin 50 is inserted in a recess in the knob 51 which opens adjacent the surface of the top plate 4 which is provided with suitable detents for receiving the point of the pin and retaining the knob in any of its positions.

The tubular shaft 52 on which the knob 51 is rigidly mounted, carries a threaded nut 61 which is secured in the lower end of the shaft 52 in any suitable manner as by soldering. A bearing 62 is secured at an intermediate position in the tubular shaft 52. The upper end of a smaller worm shaft 63 extends slidably through the bearing 62 in the tubular shaft and the lower end of the worm shaft 63 extends slidably through a stationary bearing 64 projecting laterally from the side wall.

The intermediate portion of the worm shaft 63 carries a worm screw 65 which is threadably received by the nut 61 in the lower end of the threaded shaft. A bifurcated arm 66 is clamped by screws to the lower end of the worm screw 65 which is slightly flattened. One end of the arm 66 extends through a slot 67 of the side wall and is secured to the cut-off knife 22 which it controls. The other end of the arm 66 is rounded, as shown in Fig. 3, to provide a cam surface for cooperation with a cam lever 68 which is mounted on a pivot bearing 69 adjacent thereto.

When the control knob 51 is turned, the tubular shaft 52 and the threaded nut 61 are rotated. The bifurcated arm prevents the worm screw 65 rotating with the nut 61 hence the worm and the attached arm 66 are lifted. As the arm 66 is raised, it lifts the cut-off knife 22 which is secured thereto. When the knob is turned 90 degrees counter-clockwise, the indicating pointer 54 is toward the legend Stop on the top plate. In this position the knife 22 is raised sufficiently to clear the film passage 21.

When the control knob is turned an additional ninety degrees, counter-clockwise, the rounded portion of the arm 66 enters the concave cam surface 73 of the cam arm 68 which is then released and trips the associated mechanism to operative position. As shown, the cam lever 68 controls a spring biased brake arm 72 through a plunger rod 71 which extends slidably through the side wall of the compartment and normally holds it pressed against a rotatable member 70, such as a disk on a governor connected to the film driving guide pulley 17 and associated motor. If additional controls are to be simultaneously operated, this may be conveniently provided for by providing additional cam levers to cooperate with the arm or switch contacts may be operated by the rotatable members. The operation of additional steps of control may be indicated on the top plate by providing suitable indicia at the proper positions. In the final position of the control knob 51 its indicating pointer 54 is adjacent the indicia Run on the top plate of the camera unit.

If the operator desires to stop the apparatus without cutting off the exposed film, he turns the knob only as far as the legend Stop. He may then restart the apparatus and take additional records on the same film by returning the knob to the Run position.

When the required cardiograms or oscillograms have been taken, the operator may turn the knob through to Cut off which will stop the apparatus, cut-off the film and unlock the magazine so that it may be removed. The operator then grasps the knob 27 on the magazine and lifts it from the camera unit. As the magazine is lifted, the shutter 23 on the magazine is closed by the biasing spring 35 since the stop 44 is no longer effective to hold it elevated. Simultaneously the spring pressed latch 57 in the top plate 4 is elevated and engages the slot 58 in the lower side of the control knob 51, thereby locking the latter in its Cut off position while the magazine is removed. The cut-off knife, being lowered, also serves a shutter to keep light out of the camera unit, and prevents fogging of the film on the film reel.

It will be seen that I have provided a simple interlocked control mechanism for controlling a cardiograph apparatus wherein the various control elements are all controlled simultaneously and in the proper sequence by the manipulation of a single control knob on the panel.

Although I have shown and described certain specific embodiments of my invention, I am fully aware that many modifications thereof are possible. My invention, therefore, is not to be restricted except as necessitated by the prior art and the scope of the appended claims.

I claim as my invention:

1. The combination with a recording device comprising a camera unit having a removable film receiving magazine, of a control member for controlling the various functions of the apparatus in proper sequence, means associated therewith for locking the magazine in the camera unit in all positions of the control member except one, and means released by the removal of said magazine for locking said control member in said position.

2. The combination with a recording device comprising a film cut-off knife, and a film stop and start means, of a single control member and means associated therewith for controlling the actuation of said cut-off knife and said stop and start means in succession in accordance with the position of said member.

3. The combination with a recording device comprising a camera unit having a removable film receiving magazine, a film cut-off knife, and a film stop and start means, of a single control member and means associated therewith for controlling the actuation of said cut-off knife and said stop and start means in succession in accordance with the position of said member, additional means on said member for locking said magazine in said camera unit in all positions of said member except one and means released by the removal of said magazine for locking said control member in said one position.

4. The combination with a recording device comprising a camera unit having a removable film receiving magazine, a film cut-off knife, and a film stop and start means, of a single rotatable control knob, means associated therewith for converting the rotating motion of said knob to a motion of translation for operating said cut-off knife, means associated with said means for controlling said film stop and start means, additional means on said control member for locking said magazine in said camera unit in all positions of said member except the film cut-off position, and means released by the removal of said magazine for locking said control member in said cut-off position.

5. The combination with a recording device comprising a camera unit having a removable film receiving magazine, of a single control member for successively controlling the various functions of said apparatus, means controlled by said member for locking said magazine in said camera unit, and means controlled by the position of said magazine for latching said member.

6. The combination with a recording device comprising a camera unit having a removable film receiving magazine, a film cut-off knife, and a film stop and start means, a single control member for successively controlling the stop and start means and the knife to successively perform their various functions as it is moved through positions designated as run, stop and cut off, means associated with said member to lock the magazine in said camera unit while said member is in the run or stop position, and means controlled by the removal of said magazine for latching said member in the cut off position.

7. The combination with a recording device comprising a film cut-off knife, and a film stop and start means, of a single control member, and light proof means associated therewith for controlling the actuation of said elements in succession in accordance with the position of said member.

CLARE ANDERSON.